United States Patent [19]

Sato

[11] Patent Number: 4,598,382
[45] Date of Patent: Jul. 1, 1986

[54] MULTIPLYING CIRCUIT

[75] Inventor: Tai Sato, Yokohama, Japan

[73] Assignee: Tokyo Shibaura Denki Kabushiki Kaisha, Japan

[21] Appl. No.: 521,656

[22] Filed: Aug. 10, 1983

[30] Foreign Application Priority Data

Sep. 16, 1982 [JP] Japan ............................ 57-161220

[51] Int. Cl.$^4$ .......................... G06F 7/52; G06F 7/38
[52] U.S. Cl. .................................... 364/757; 364/745
[58] Field of Search ....................... 364/745, 757, 758

[56] References Cited

U.S. PATENT DOCUMENTS

| 3,947,670 | 3/1976 | Irwin et al. | 364/745 |
| 4,041,297 | 8/1977 | Jesse | 364/758 |
| 4,475,167 | 10/1984 | Chen | 364/757 |

OTHER PUBLICATIONS

De Mori et al., "A Special-Purpose Computer for Digital Signal Processing", IEEE Trans. on Computers, vol. c-24, No. 12, pp. 1202-1211, Dec. 1975.
Gibson et al., "Synthesis and Comparison of Two's Complement Parallel Multipliers", IEEE Trans. on Computers, vol. c-24, No. 10, pp. 1020-1027, Oct. 1975.
Jump et al., "Effective Pipelining of Digital Systems", IEEE Trans. on Computers, vol. c-27, No. 9, pp. 855-865, Sep. 1978.
Nakamura et al., "A Digital Signal Processing LSI," Digest of Technical Papers IEEE Int. Solid-State Circuits Conference 1982, pp. 30-31, 193-6530/82, Feb. 10, 1982.
Mogar et al., "Digital Signal Processor," Digest of Technical Papers, IEEE Int. Solid State Circuits Conference 1982, pp. 32-33, 193-6530/82, Feb. 10, 1982.

Primary Examiner—James D. Thomas
Assistant Examiner—Dale M. Shaw
Attorney, Agent, or Firm—Finnegan, Henderson, Farabow, Garrett & Dunner

[57] ABSTRACT

A multiplying circuit comprises an array circuit for producing a product of a multiplicand and multiplier by adding respective partial products together each of a multiplicand in each bit and a multiplier in each bit. The array circuit produces only an $(n+1)$ or more bits of the product, where n denotes a positive integer which is not greater than the bit number of the multiplicand and the bit number of the multiplier. The multiplying circuit comprises a circuit for producing a binary compensation signal representing an integral value closest to a real number given by $$\{(n-1)+(1/2^n)\}/2$$

and a circuit for adding the compensation signal to the output from the array circuit.

2 Claims, 5 Drawing Figures

MULTIPLYING CIRCUIT

BACKGROUND OF THE INVENTION

This invention relates to a parallel type multiplying circuit for multiplying binary numbers of a plurality of bits with each other.

In general, the product of binary numbers is found by finding a partial product of a multiplicand in each digit and a multiplier in each digit and adding the respective partial products together. FIG. 1 shows a conventional parallel type multiplying circuit for realizing this algorithm. Suppose that a multiplicand X and multiplier Y are 4-bit numbers. In this case 16 ($=4\times4$) unit circuits $U_1$ to $U_{16}$ are connected in an array and each has the same configuration. For brevity's sake, only the unit circuit $U_{16}$ is illustrated in detail in FIG. 1 and the other unit circuits are shown in a block form. Each unit circuit comprises an AND circuit 10 for finding a partial product A of a multiplicand $X_i$ and multiplier $Y_j$ and a full adder 12 for adding the partial product A to an ouput B from a preceding stage with a carry input C' in order to find a sum output S and carry output C.

Unit circuits $U_1$ to $U_4$ find respective partial products of multiplicands $X_1$ to $X_4$ and multiplier $Y_1$ of a first (a least significant) bit. Unit circuits $U_5$ to $U_8$ find partial products of the multiplicands $X_1$ to $X_4$ and multiplier $Y_2$ of a second bit. Unit circuits $U_9$ to $U_{12}$ find partial products of the multiplicands $X_1$ to $X_4$ and multiplier $Y_3$ of a third bit. Unit circuits $U_{13}$ to $U_{16}$ find partial products of the multiplicands $X_1$ to $X_4$ and multiplier $Y_4$ in a fourth (a most significant) bit. The sum outputs S of the unit circuits $U_1$, $U_5$, $U_9$, $U_{13}$, $U_{14}$, $U_{15}$ and $U_{16}$ and a carry output C of the unit circuit $U_{16}$ correspond to products $P_1, \ldots$ and $P_8$ of the first (the least significant) bit to the eighth (the most significant) bit, respectively.

Such a conventional multiplying circuit can find all the partial products, and it is necessary to provide (the bit number of the multiplicand)×(the bit number of the multiplier) unit circuits. Where the number of the multiplicand (which is usually the same as the number of multiplier) is small, for example, 4 or 8, no appreciable problem occurs as to the number of the unit circuits required. However, since the unit circuits increase in proportion to the square of the bit number of the multiplicand (or multiplier), a plurality of hardware elements are required for an increase in the bit number of the multiplicand (or multiplier). For example, 576 unit circuits are required to multiply 24-bit numbers with each other. Where the unit circuits are made up of MOS elements, about 15,000 MOSFETs are necessary. This applies not only to a parallel multiplying circuit utilizing a simple algorithm, but also to a parallel multiplying circuit utilizing a Booth or a Wallace algorithm.

A product obtained by finding all the partial products as mentioned above is very accurate. However, the number of significant digits of a product (2n bits) of two binary numbers of n bits are only up to n and it is sufficient if an accuracy of upper n bits is maintained with respect to the product.

SUMMARY OF THE INVENTION

It is accordingly the object of this invention to provide a parallel type multiplying circuit which can obtain a required accuracy with a smaller number of elements than that required in a conventional multiplying circuit.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the multiplying circuit of this invention comprises an array circuit for producing a binary signal corresponding to an $(n+1)$ or more bits of a product of a multiplicand and multiplier by adding respective partial products together each of a multiplicand in each bit and a multiplier in each bit, where n denotes any positive integer which is not greater than the bit number of the multiplicand and the bit number of the multiplier, a circuit for producing a binary compensation signal representing an integral value closest to a real number given by $$\{(n-1)+(1/2^n)\}/2$$

and an adding section for adding the binary signal produced from the array circuit and the binary compensation signal.

The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENT

One embodiment of this invention will be described by referring to the accompanying drawings.

Figure 1:
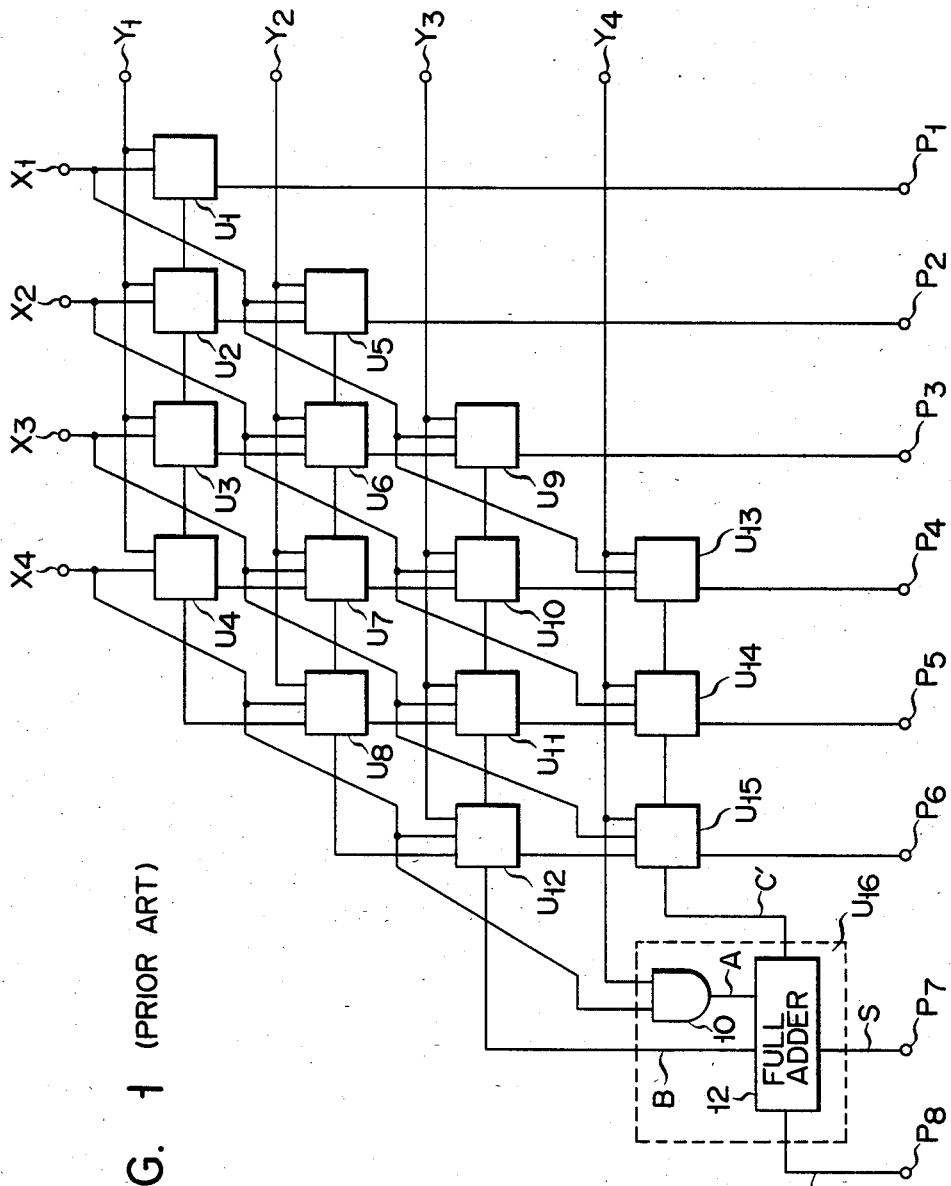
FIG. 1 is a circuit diagram showing a conventional multiplying circuit.
Figure 2:
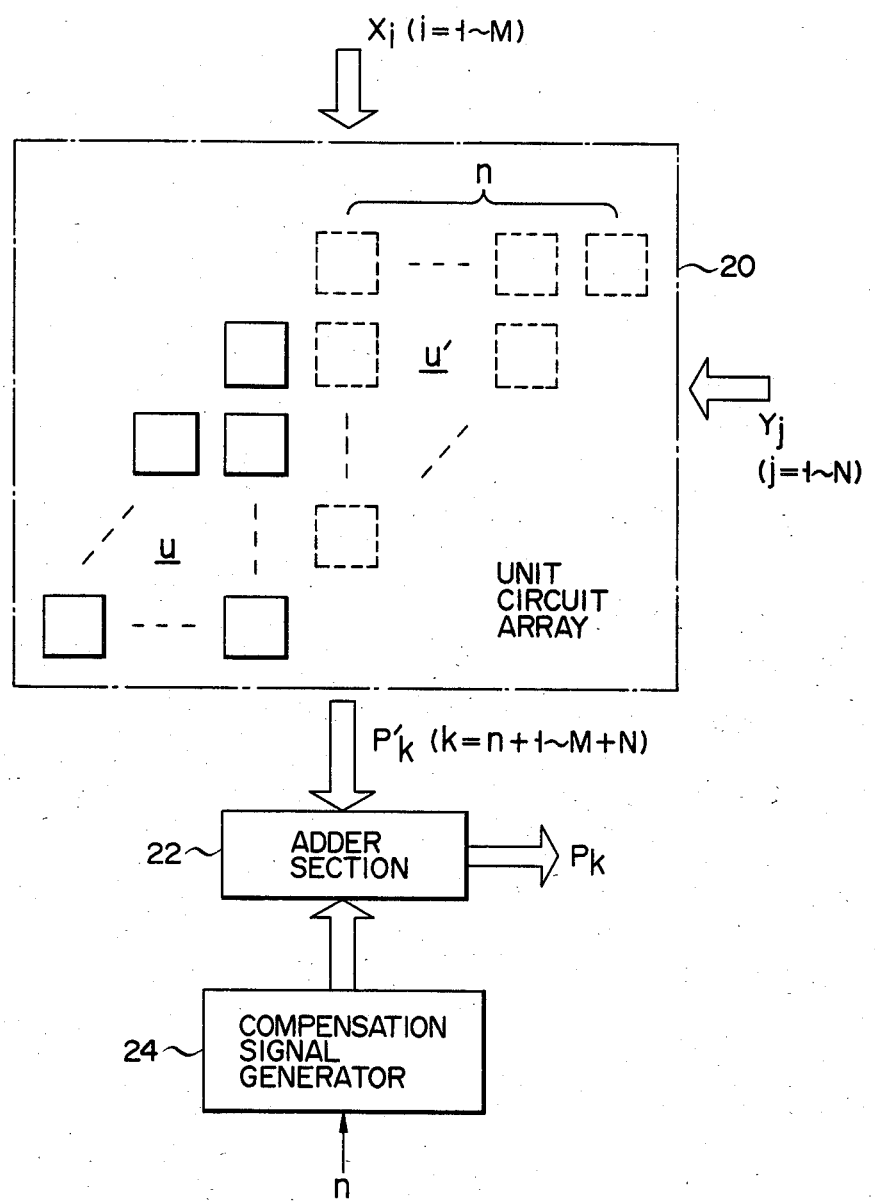
FIG. 2 is a block diagram showing a multiplying circuit constructed according to one embodiment of this invention.

FIG. 2 shows a block diagram showing a multiplying circuit according to one embodiment of this invention. A unit circuit array 20 is comprised of unit circuits the same as those of FIG. 1. Although the conventional unit circuit array of FIG. 1 is adapted to find all partial products, the unit circuit array 20 according to this embodiment does not include a unit circuit section U' (indicated by broken lines in FIG. 2) for finding product of the 1 to n-th bits. The unit circuit array 20 only includes a unit circuit section U (indicated in solid lines) for finding a product of $(n+1)$-th or more bits, where n denotes any positive integer which is not greater than the bit number of the multiplicand X, M, and the bit number of the multiplier Y, N. An output (a binary signal) $P_k'$ ($k=n+1 \sim M+N$) of the unit circuit array 20 is supplied to one input terminal of an adder section 22. A compensation output signal (a binary signal) of a compensation signal generator 24 is supplied to the other input terminal of the adder section 22. The adder section 22 adds these inputs together in such a way that the LSB of the compensation output signal is set to $P_{n+1}'$. The compensation signal generator 24 delivers a binary compensation signal representing an integral value closest to a real number given by:

$$\{(n-1)+(1/2^n)\}/2 \quad (1)$$

The output $P_k(k=n+1\sim M+N)$ of the adder section 22 represents the $(n+1)$-th or more bits of a product of the multiplied $X_i(i=1\sim M)$ and multiplier $Y_j(J=1\sim N)$.

According to this embodiment, it is not necessary to find all the partial products. A compensation value is added to an obtained product, without the need of finding partial products associated with the 1 to n-th bits of the product, with the result that the number of elements can be reduced without appreciably lowering the accuracy. The description of how the product $P_k$ thus obtained has a sufficient accuracy in actual practice will next be given.

Now-suppose that mantissas (24 bits) of a floating point representation binary number are multiplied together. With the 1 to n-th bits of a product being 0, a possible error is between 0 at the minimum and $$\sum_{i=0}^{n-1} (i + 1)2^i = (n - 1)2^n + 1 \quad (2)$$

at the maximum, noting that Equation (2) is a sum of partial products of the 1 to n-th bits when they are all 1's. For this reason, if one half of the maximum error, $$\{(n-1)2^n+1\}/2 \quad (3)$$

is added to the product with the 1 to n-th bits being 0, this will result in the best average accuracy. Since the product $P_k$ is weighted towards the $(n+1)$-th or more bits, a compensation value to be added is such as to be n-bit shifted, i.e., of the form $$\{(n-1)+(1/2^n)\}/2$$

as obtained by dividing Equation (3) by $2^n$.

Now suppose that, in the multiplication of mantissas of 24 bits, n=24, i.e., the 1 to 24-th bits of a product are omitted. In this case, the compensation value of Equation (1) is about 11.5 and a product is obtained by adding a binary number 1011, corresponding to a decimal number 11, to the output $P_k'$ $(k=n+1\sim n+4)$ of the unit circuit array 20 for each bit. At this time, a maximum value $E_{max}$ of the relative error (a ratio of an error component to a correct value) of an error contained in the product is given by:

$$E_{max} = \frac{error_{max}}{multiplicand_{min} \times multiplier_{min}} \quad (4)$$

$$= \frac{(24 - 1) + \frac{1}{2^{24}}}{2 \times 2^{46-24}}$$

$$\approx \frac{23}{2^{23}}$$

$$= 2^{-23+4.52}$$
$$= 2^{-18.48}$$

From Equation (4) it will be evident that, with the 1 to 24-th bits omitted in the multiplication of binary numbers of 24 bits, a product obtained through the compensating operation based on Equation (1) has an 18-bit accuracy at least. In order to obtain a nearly 23-bit accuracy, the 1 to 20-th bits can be omitted as evident from Equation (5) below.

$$E_{max} = \frac{(20 - 1) + \frac{1}{2^{20}}}{2 \times 2^{46-20}} \approx \frac{19}{2^{27}} \quad (5)$$

$$= 2^{-22.75}$$

A comparison in a calculation process between the conventional circuit and the circuit of this invention will be made below by referring to FIGS. 3 and 4.

Figure 3:
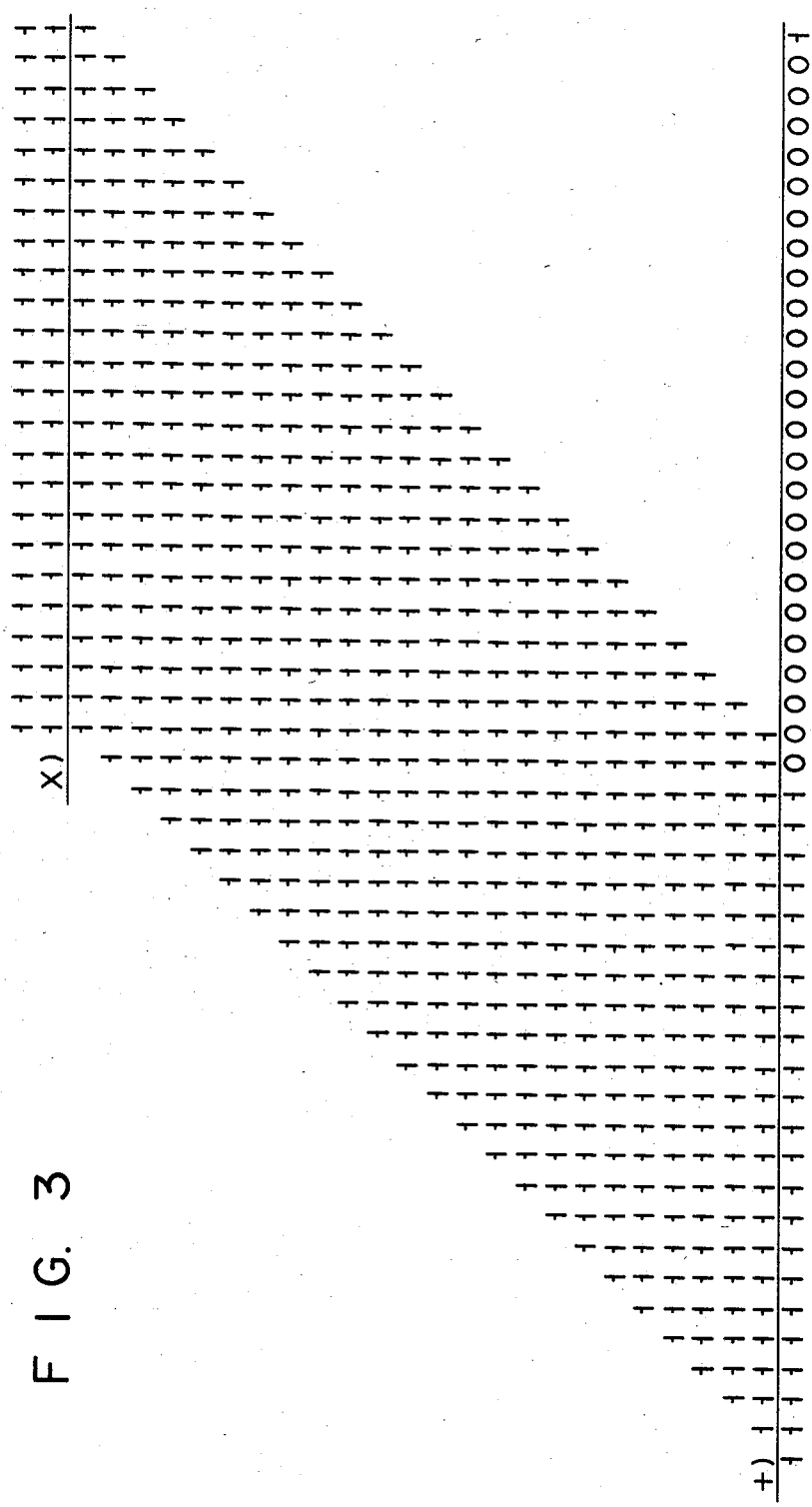
FIGS. 3 and 4 respectively show a multiplying process of a conventional multiplying circuit and that of the multiplying circuit according to this invention in order to show a comparison therebetween.

FIG. 3 shows a calculation process for multiplying binary numbers $(2^{24}-1)$ of 24 bits with each other by obtaining all the partial products. A product obtained in this case is $2^{48}-2\times 2^{24}+1$. When the 24-th bit of the product is rounded-off, with the 1 to 24-th bits of this value omitted, the product is $2^{48}-2\times 2^{24}$. FIG. 4 shows a calculating process of $(2^{24}-1)\times(2^{24}-1)$ according to this invention, provided that n=20. A product of the 21-st or more bits is found by the unit circuit array 20 (FIG. 2) and added to a compensation signal 1001 (i.e., $9\approx\{(20-1)+(1/2^{20})\}/2$) to yield a product as shown in FIG. 4. When the 24-th bit of the product is rounded-off, an answer of $2^{48}-3\times 2^{24}$ is obtained. In this case, a relative error is $1\times 2^{24}/2^{48} =2^{-24}$. The answer obtained according to this embodiment has a 24-bit accuracy, noting that the 1 to 24-th bits of the answer are omitted.

Figure 4:
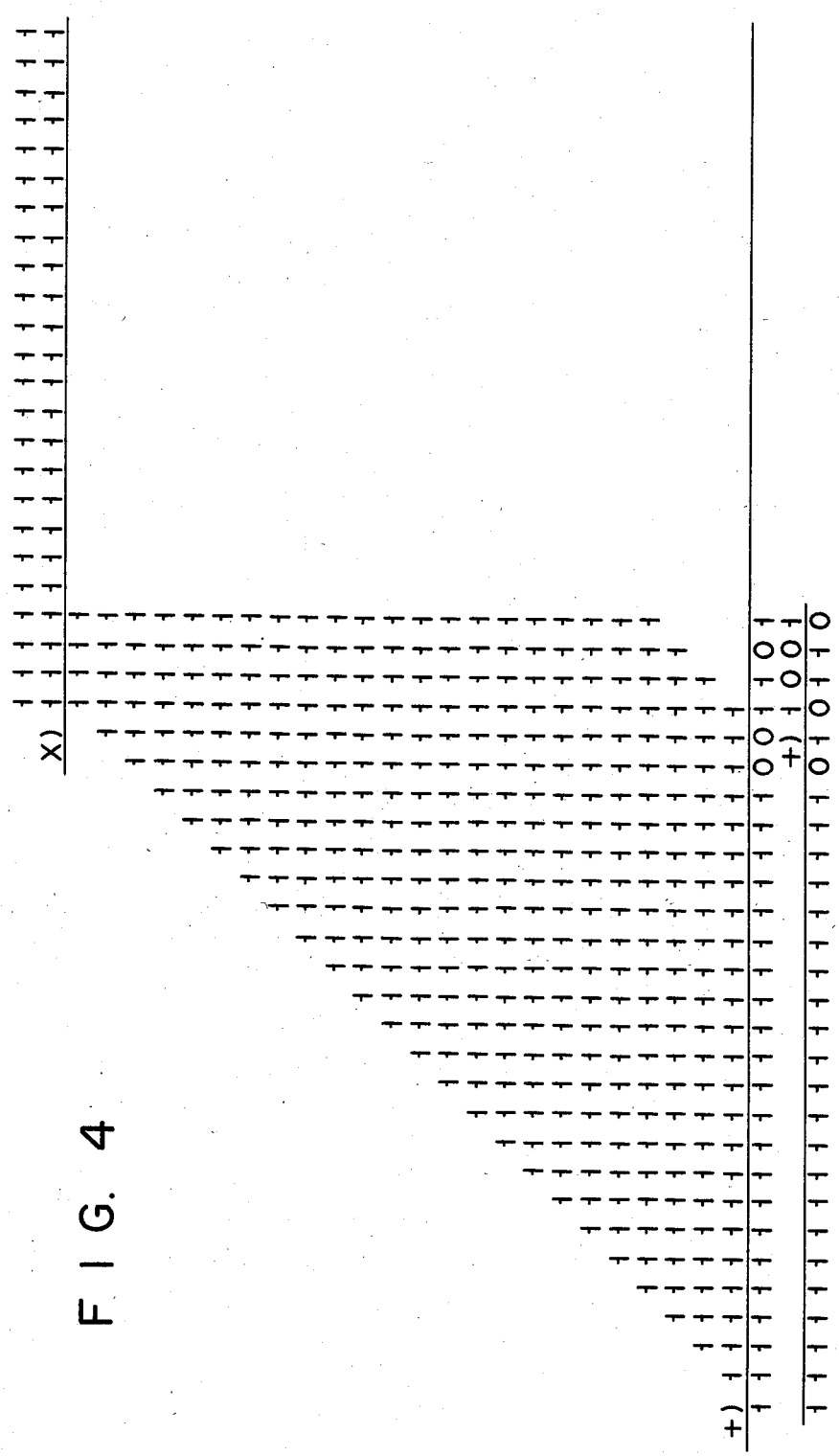

The number of the unit circuits necessary for the calculation of FIG. 4 is $$\frac{24 \times 25}{2} + 23 + 22 + 21 = 366,$$

i.e., about 64% of the 576 unit circuits of the conventional multiplying circuit. On the other hand, the provision of the adder circuit 22 and compensation signal generator 24 involves a 1% increase in the number of elements in comparison with the unit circuits.

Figure 5:
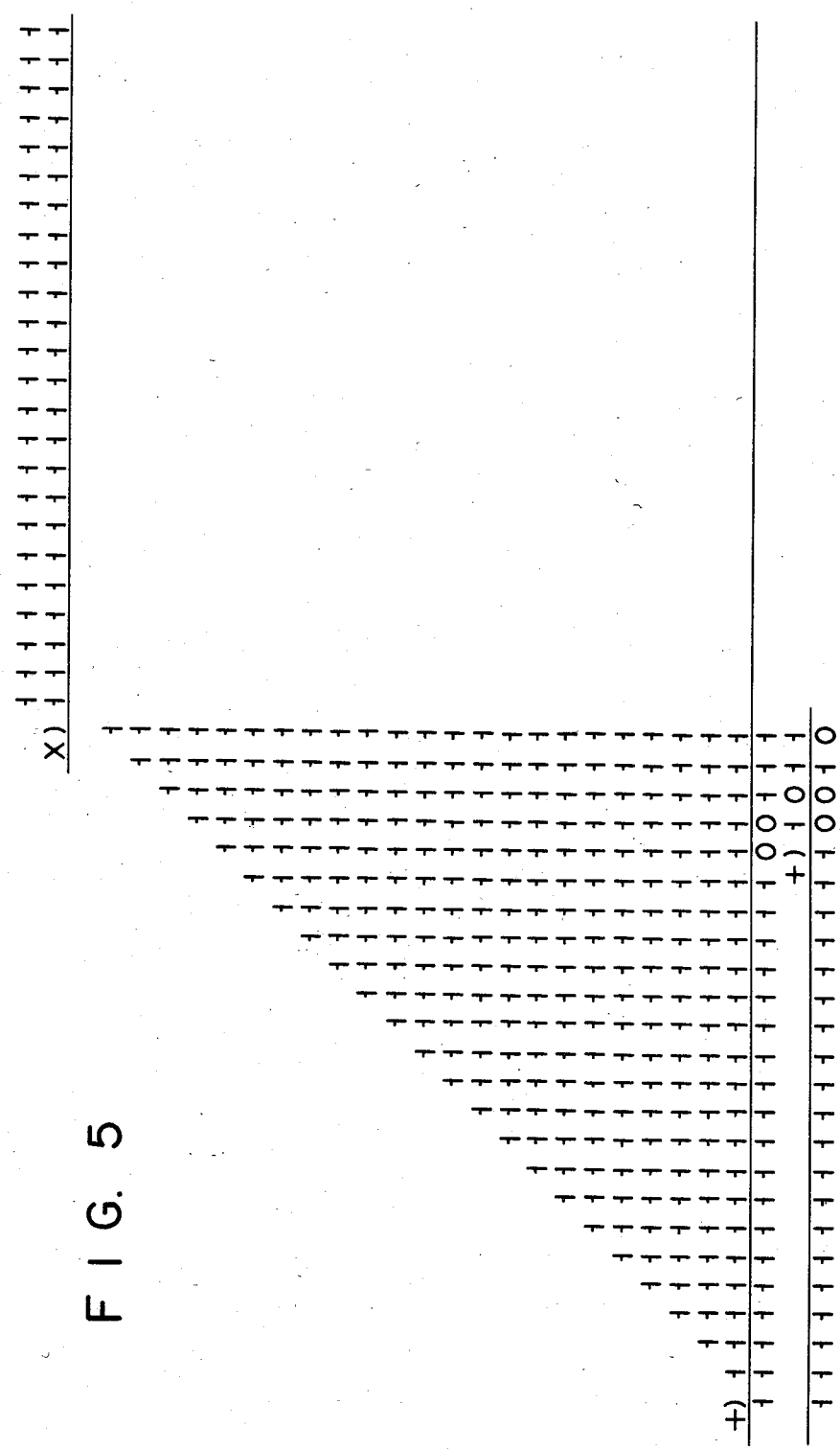
FIG. 5 shows a multiplying process according to another embodiment of this invention.

FIG. 5 shows a calculation process of $(2^{24}-1)\times(2^{24}-1)$, noting that n=24. In this case, a product of the 25-th or more bits is found by the unit circuit array 20 and added to a compensation signal 1011 (i.e., $11\approx\{(24-1)+(1/2^{24})\}/2$), yielding an answer, $2^{48}-15\times 2^{24}$ as shown in FIG. 5. In this case, a relative error is $14\times 2^{24}/2^{48}=14\times 2^{-24}\approx 2^{-20.2}$ and thus, a 20-bit accuracy is obtained. The number of the unit circuits necessary for the calculation of FIG. 5 is $$\frac{22 \times 23}{2} + 23 = 276,$$

i.e., about 48% of the number of unit circuits required in the conventional multiplying circuit.

According to this invention a multiplying circuit is provided which can reduce the number of elements, while maintaining a sufficient practical accuracy.

It is to be noted that this invention can be applied not only to an array type multiplying circuit utilizing a simple algorithm, but also to a multiplying circuit utilizing a Booth or a Wallace algorithm.

What is claimed is:

1. A multiplying circuit comprising:

array circuit means for producing a binary signal corresponding to at least (n+1)-th bits of a product of a multiplicand and multiplier by adding partial products together each having a multiplicand bit and a multiplier bit, where n is any positive integer which is not greater than the smaller one of the bit number of the multiplicand and the bit number of the multiplier;

means for producing a binary compensation signal representing an integral value corresponding to a real number given by $(n-1)+(1/2^n)/2;$ and means for adding the binary signal produced from said array circuit means and the binary compensation signal.

2. A multiplying circuit according to claim 1, in which said array circuit means comprises a plurality of unit circuits each comprised of an AND gate for producing a partial product of a multiplicand in each bit and a multiplier in each bit, and a full adder for adding an output of the AND gate and output of a preceding stage.

* * * * *